Sept. 16, 1958  F. H. STIRES  2,852,218
FISHING ROD HOLDER
Filed Aug. 9, 1956  2 Sheets-Sheet 1
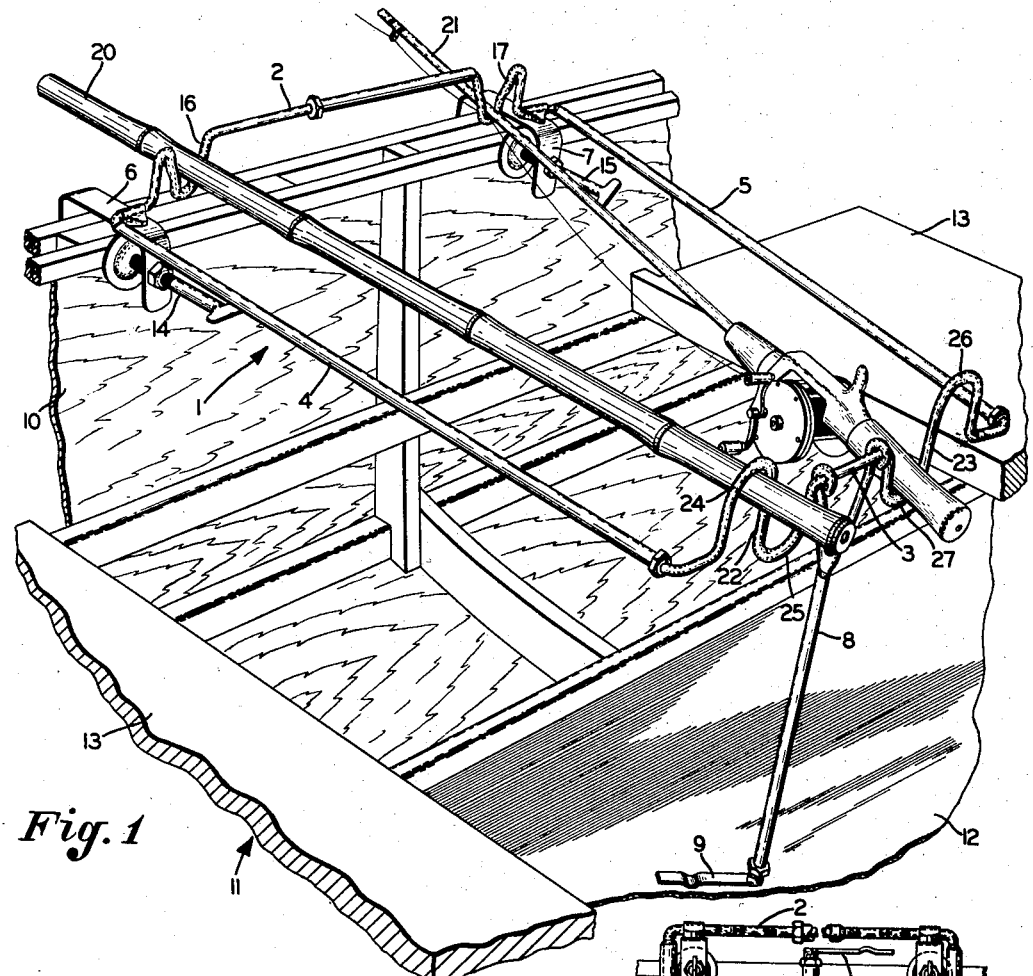
Fig. 1
Fig. 2
Fig. 3
INVENTOR.
Frederick H. Stires
BY
Frease & Bishop
ATTORNEYS
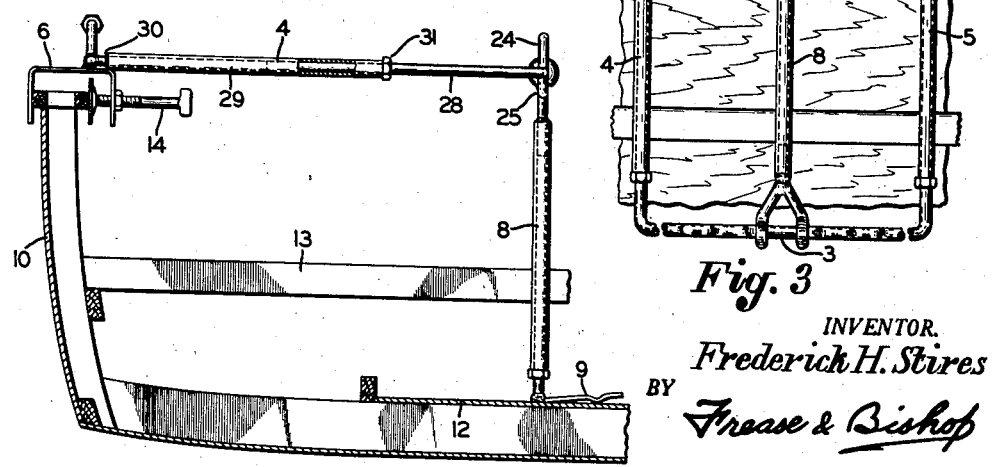

Sept. 16, 1958  F. H. STIRES  2,852,218
FISHING ROD HOLDER

Filed Aug. 9, 1956  2 Sheets-Sheet 2

INVENTOR.
Frederick H. Stires
BY
Frease & Bishop
ATTORNEYS

United States Patent Office 2,852,218
Patented Sept. 16, 1958

2,852,218

FISHING ROD HOLDER

Frederick H. Stires, Canton, Ohio

Application August 9, 1956, Serial No. 603,045

3 Claims. (Cl. 248—39)

The device of the present invention is adapted to overcome several problems that have existed with prior holders for fishing rods. Most prior fishing rod holders for use in a boat are attached to the gunwale or outboard side of the boat. As a result of the boat rolling, the portion of the fishing rod extending over the water moves excessively. Moreover, rod holders mounted on the side of a boat usually extend therebeyond, requiring adjustment or removal whenever the boat is adjacent another boat or object.

In addition, many prior fishing rod holders for boats accommodate only one fishing rod. In many localities fishing laws permit the use of two or three rods per fisherman. Many prior fishing rod holders also accommodate only one type of fishing rod and are not adaptable to other kinds of poles including casting rods and cane poles.

The device of the present invention satisfies the foregoing problems and provides other advantages not inherent in previous fishing rod holders. The device is a frame member that is completely adjustable and includes extendible side members for accommodating any kind of fishing rod. One of its primary advantages is that it will hold trolling rods, casting rods, or cane poles, within an arm's length of the fisherman. The fishing rods are easily placed on the frame and easily removed. When two rods are on the frame, one end of the frame may be expanded to a desired length to permit the rods to diverge at an angle so that the outer ends of the rods are spaced from each other a satisfactory distance.

The fishing rod holder of the present invention may be easily placed on either side of the boat and when not in use it may be folded up and stored against the inner side of the boat.

In addition, the frame is provided with a pedestal which ordinarily extends to the bottom of the boat where it may be engaged beneath a slat or other convenient object. Where a can pole is used, it is desirable to anchor the lower end of the pedestal. However, with the ordinary casting rod or trolling rod the pedestal may be placed merely on the bottom of the boat. Finally the pedestal is adjustable in length to raise or lower the outer ends of the rods with respect to the water surface.

Accordingly, it is an object of this invention to provide a holder for fishing rods which holds the rods in a boat within easy reach of the fisherman.

Another object of this invention is to provide a holder for more than one fishing rod within a boat, which rods are supported at angles to each other and at an adjustable distance above the surface of the water.

Another object of this invention is to provide a completely adjustable holder for fishing rods which may be clamped to the side of a boat for use and stored against the side of the boat in a collapsed position when not in use.

Finally, it is an object of this invention to provide an improved fishing rod holder which incorporates the foregoing desiderata in an inexpensive manner and with simplified operation.

These and other objects and advantages apparent to those skilled in the art from the following description and claims may be obtained, the stated results achieved, and described difficulties overcome by the discoveries, principles, apparatus, parts, combinations, subcombinations and elements which comprise the present invention, the nature of which is set forth in the following statement, preferred embodiments of which, illustrative of the best modes in which applicant has contemplated applying the principles, are set forth in the following description, and which are particularly and distinctly pointed out and set forth in the appended claims forming part hereof.

The fishing rod holder of the present invention may be stated generally as including a frame having two spaced end members and two interconnecting side members, two spaced clamps on one end member for securing the frame on the side wall of a boat, a pedestal depending from the other end member to the bottom wall of the boat, said one end member having two spaced V-shaped notches for receiving fishing rods, the lower end of each notch being narrow for accommodating rods of small diameter and the upper portion of each notch being relatively wider for accommodating cane poles, said other member having two spaced S-shaped notches for receiving fishing rod handles, said one end member being composed of expansible portions for increasing or decreasing the spacing between the V-shaped notches thereon, the interconnecting side members also having expansible portions for increasing or decreasing the spacing between the two end members, and the frame being collapsible for storage against the side of the boat without disconnecting the clamps from the boat.

By way of example, the improved fishing rod holder is shown in the accompanying drawings, in which:

Fig. 1 is a perspective view of one embodiment of the present invention;

Fig. 2 is a side elevational view of the device, partly in section;

Fig. 3 is an elevational view broken away, showing the device collapsed and folded against the side wall of the boat when not in use;

Similar numerals refer to similar parts throughout the several views of the drawings.

Figure 4:
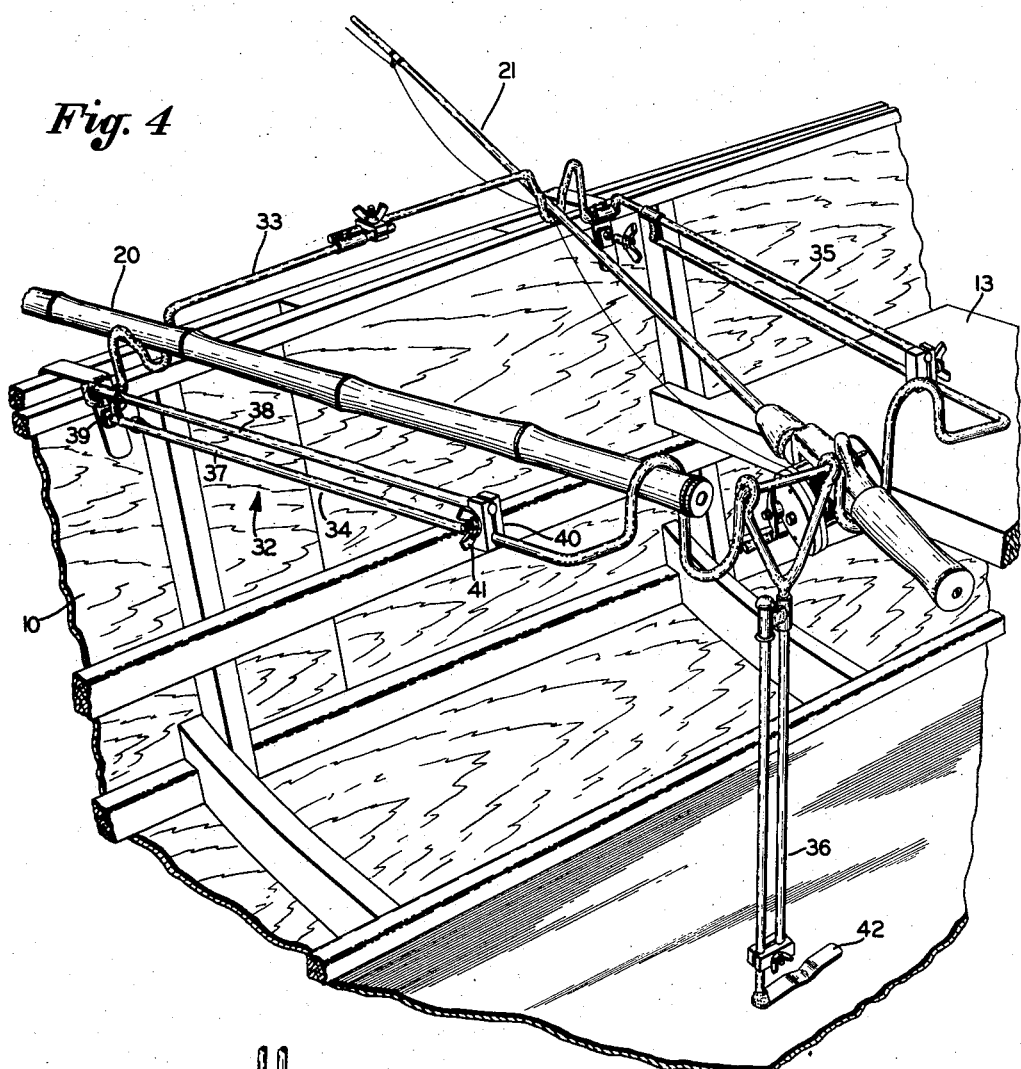
Fig. 4 is a perspective view of another embodiment of the present invention.

In Fig. 1, the device of the present invention is generally indicated at 1. It includes a forward end portion 2, a rear end portion 3, and side end portions 4 and 5. On the forward end portion 2 a pair of clamps 6 and 7 are rotatably mounted adjacent side portions 4 and 5, respectively. The clamps 6 and 7 include tightening screws 14 and 15 by which the frame 1 may be removably attached. A pedestal or shaft 8 is pivotally mounted on the rear end portion 3 and is provided at the lower end with a foot 9 adapted for resting upon the bottom of the boat.

As shown in the drawings, the frame 1 is adapted for attachment to the gunwale or side 10 of a boat generally indicated at 11, which boat also includes a bottom wall 12. Other portions of the boat 11 shown in the drawing include spaced similar seats 13, between which the frame 1 is preferably attached to the side wall 10 of the boat.

Figure 6:
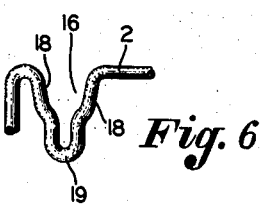
Fig. 6 is an enlarged fragmentary view of a V-shaped notch on the frame.

The forward end portion 2 includes a pair of generally V-shaped notches 16 and 17 adjacent the clamps 6 and 7, respectively. The notches receive fishing rods of various dimensions as shown in Figs. 1 and 4. For example, in Fig. 6 the notch 16 is shown in detail and includes similar arcuate portions 18 spaced from each other, and a smaller U-shaped portion 19 below the portions 18. As shown in Fig. 6, the portions 18 are spaced from each other by a distance greater than the members forming the U-shaped portions 19. The upper portions 18 of the notches 16 and 17 receive fishing rods having larger dimensions, such as a cane pole 20, and the lower U-shaped portions 19 receive fishing rods of smaller dimension, such as a casting rod 21, as shown in Fig. 1.

The rear end portion 3 of the frame 1 includes a pair of S-shaped notches 22 and 23. The S-shaped notch 22 includes an inverted U-shaped portion 24 and an upright U-shaped portion 25. Likewise, the S-shaped notch 23 includes an inverted U-shaped portion 26 and an upright U-shaped portion 27. The inverted U-shaped portions 24 and 26 are adapted to receive the ends of fishing rods, such as the cane pole 20, having heavier portions of the rod extending beyond the side of the boat. The cane pole 20 is retained in equilibrium in the frame 1 when it is mounted as shown in Fig. 1 between the spaced arcuate portions 18 of the notch 16 and the inverted U-shaped portion 24 of the notch 22.

On the other hand, the upright U-shaped portions 25 and 27 of the notches 22 and 23 are adapted to receive fishing rods, such as the casting rod 21, in which the heavier portion of the rod is disposed within the boat. The rod 21 is disposed between the U-shaped portion 19 of the notch 17 and the upright U-shaped portion 27 of the notch 23.

The frame 1 is provided with expansible members which may be extended or contracted as fishing conditions require. The forward end portion 2, the side portions 4 and 5 and the pedestal shaft 8 include similar expanding units. In Fig. 2 the expanding unit side portion 4 is shown in detail. It includes a rod member 28 and a tubular member 29, one end of which is secured at 30 near the clamp 6 and the other end of which is provided with a tightening nut 31. The members 28 and 29 are slidable with respect to each other and tightened at the desired length by the tightening nut 31. The advantage of the expansible end and side portions is shown in Fig. 1. When two fishing rods are mounted on the frame 1, the forward end portion 2 may be expanded so that the fishing rods 20 and 21 extend at an angle to each other from the rear end portion 3. The outer ends of the rods 20 and 21 are at a greater distance from each other.

When the frame 1 is not in use it may be collapsed and stored against the inner side wall 10 of the boat as shown in Fig. 3. The pedestal 8 is turned upwardly toward the forward end portion 2 of the frame and the frame 1 is lowered about the pivot points on the clamps 6 and 7 until the rear end portion 3 contacts the bottom of the boat.

Another embodiment of the invention is shown at 32 in Fig. 4. It is similar to the frame 1 except that the various portions including a forward end portion 33, side portions 34 and 35, and a pedestal 36 are provided with expansible units differing from expansible members provided for corresponding portions of the frame 1. For example, in Fig. 4, the side portion 34 includes overlapping parallel rods 37 and 38. The end of the rod 37 is slidably attached to the rod 38 at 39. The end of the rod 38 is attached to the rod 37 by a clamp 40 including a tightening nut 41. The side portion 34 may be extended by loosening the clamp 40 and reducing the amount of overlap of the rods 37 and 38, as shown on the forward end portion 33 in Fig. 4.

Figure 5:
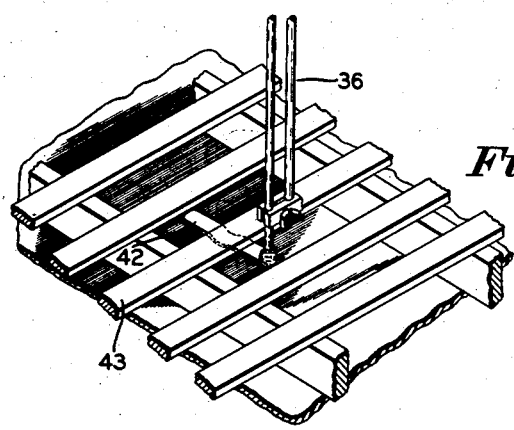
Fig. 5 is a fragmentary view showing the manner in which the pedestal may be engaged at the bottom of a boat below slats.

In Fig. 5, the pedestal 36 has a foot 42 which may be inserted below a slat 43 where the bottom of the boat is provided with slats, as shown in Fig. 5. In addition, the foot 42 may be weighted down by other means when necessary or it may be placed under the edge of a seat 13 of the boat to hold the frame 32 in the proper position, as shown in Fig. 4.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction shown.

Having now described the features, constructions and principles of the invention, the characteristics of the new fishing rod holder construction, and the advantageous, new and useful results provided; the new and useful discoveries, principles, parts, elements, combinations, subcombinations, structures and arrangements, and mechanical equivalents obvious to those skilled in the art are set forth in the appended claims.

I claim:

1. A support device for holding fishing rods in a boat having side and bottom walls, including a frame having two end members and two side members, clamps at remote ends of one end member for engaging the side wall of the boat, a pedestal extending from the other end member to the bottom wall of the boat, said one end member having two spaced V-shaped rod-receiving notches, said other end member having two spaced U-shaped notches for receiving handles of the rods, and said one end member and two side members having overlapping expansible portions.

2. A support device for holding fishing rods in a boat having side and bottom walls, including a frame having two spaced end members and two spaced side members, a pair of clamps pivotally attached to one of said end members for engaging the side wall of the boat, a pedestal pivotally mounted on the other end member, the pedestal, two side members and said one end member having overlapping expansible portions, said one end member having two spaced V-shaped notches for receiving fishing rods, the notches being in different expansible portions of said end member, the notches having a lower portion of smaller dimension than the upper portion thereof, and the other end member having spaced upright U-shaped notches and spaced inverted U-shaped notches.

3. A support device for holding fishing rods in a boat having side and bottom walls, including a frame having two end members and interconnecting support means between the end members, clamping means on one end member for securing the frame on the side wall with the frame extending over the bottom wall of the boat, a pedestal pivotally mounted on the other end member and extending to the bottom wall of the boat, said one end member having two spaced V-shaped rod-receiving notches, the notches having a lower portion of smaller dimension than the upper portion thereof, and the other end member having spaced upright U-shaped notches and spaced inverted U-shaped notches.

References Cited in the file of this patent

UNITED STATES PATENTS

| | | |
|---|---|---|
| 2,289,695 | Bryant | July 14, 1942 |
| 2,773,603 | Gronek | Dec. 11, 1956 |